Oct. 8, 1935.  H. H. TIMIAN  2,016,695
ENGINE
Filed May 20, 1933
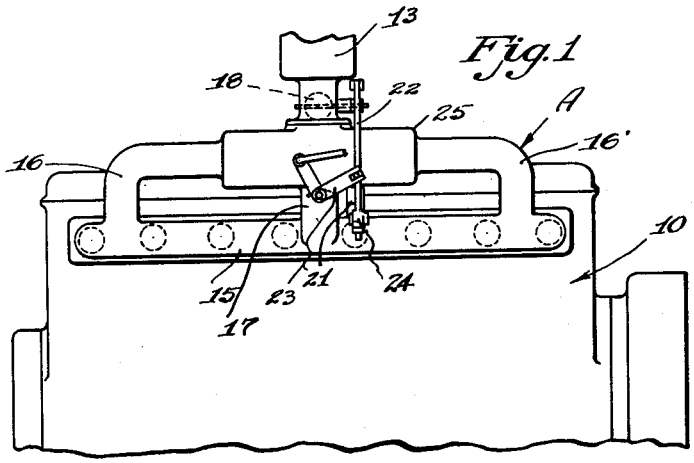
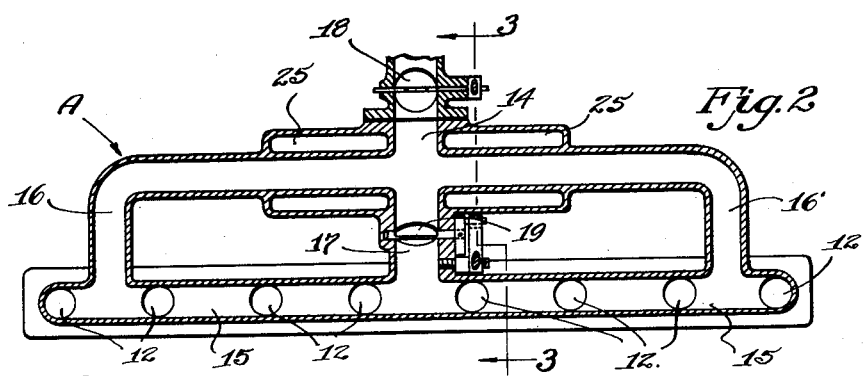
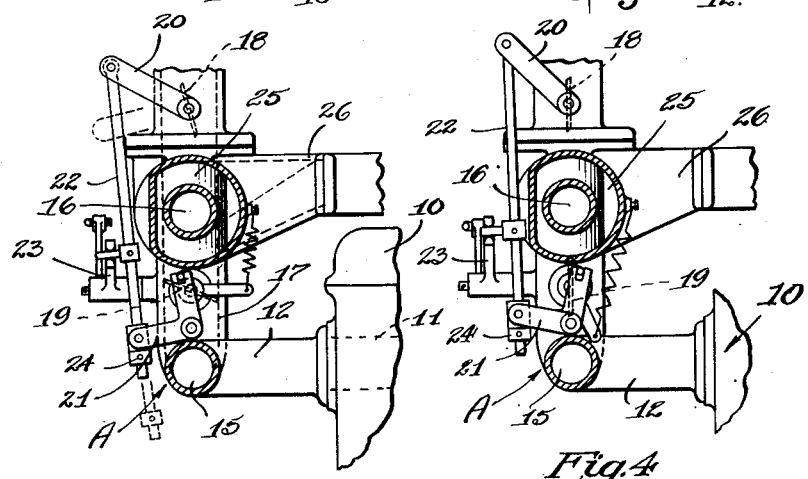
INVENTOR.
Harold H. Timian
BY
ATTORNEY.

Patented Oct. 8, 1935

2,016,695

UNITED STATES PATENT OFFICE 2,016,695

ENGINE

Harold H. Timian, Detroit, Mich., assignor to Continental Motors Corporation, Detroit, Mich., a corporation of Virginia Application May 20, 1933, Serial No. 671,971

5 Claims. (Cl. 123—122)

My invention relates to engines and more particularly to the means for distributing and conducting fuel mixture to the engine cylinders. My invention further relates in its more particular aspects to an intake manifold structure for engines in which the fuel mixture flow is controlled for the purpose of facilitating efficient engine operation throughout the range of engine speeds under which the engine is operated.

In vehicles propelled by an internal combustion engine and which are operated continuously over long periods of time and at various speeds, such as taxicabs or other like vehicles, it is found that more economical and efficient engine operation may be had by providing a manifold structure so constructed as to be operated differently at idling and low engine speeds than at relatively high engine speeds.

The requisites for low engine speed operation are different from the requisites for relatively high engine speed operation, and therefore, an intake manifold structure designed to efficiently function with an engine operated for the most part at relatively high engine speed is not as economical nor is it suitable for efficient use with an engine which is operated for the most part at relatively low engine speeds. In the taxicab service, the engines are sometimes allowed to idle for long periods of time and consequently good fuel economy cannot be obtained from the engine if the intake manifold is designed primarily for operation with an engine operating at relatively high speeds for the most part. Taxicabs or other like vehicles are often operated for long periods of time at relatively high speed and therefore if the manifold structure is designed for economical operation with an engine having low speed characteristics, it will be found that there are many times when the vehicle of this type cannot be efficiently and economically operated. In most passenger car vehicles it has been found that an intake manifold designed for relatively high speed engine operation is more satisfactory, while in trucks and other like vehicles it has been found that a manifold designed for relatively low speed engine operation is satisfactory. In taxicabs and other like vehicles which are operated both at low speed and at relatively high speed for long periods of time, it has been found that neither type of the above mentioned intake manifolds will give satisfactory results.

It is an object of my invention to provide an intake manifold structure for an engine whereby to permit the efficient and economical operation thereof throughout the range of engine speeds inclusive of the idling operation as well as the high speed operation.

Another object of my present invention is to provide for efficient engine operation throughout the entire range of engine speeds by providing an intake manifold structure with means whereby the flow of fuel mixture may be so controlled as to efficiently and economically supply the engine with an adequate supply of fuel mixture in the proper proportion of air and fuel for economical and efficient operation at low engine speeds as well as relatively high engine speeds.

More particularly it is an object of my invention to provide an intake manifold structure for engines of the character specified that is provided with a plurality of fuel mixture conducting portions leading from the fuel mixture supply and forming device or carburetor to the engine, and providing one or more means for blocking or otherwise closing one or more of the fuel mixture conducting portions or passages as desired.

It is a further object of my invention to provide an intake manifold structure of the character described with regulable means for controlling the fuel mixture flow through such fuel mixture conducting portions or passages by providing suitable devices actuated in response to engine operation and in particular in response to the engine throttle setting, the engine speed operation being directly responsive to variations in the setting of said throttle valve.

For a more detailed understanding of my invention, reference may be had to the accompanying drawing which illustrates one form which my invention may assume, and in which:

Fig. 1 is a side elevational view of an internal combustion engine having an intake manifold structure constructed in accordance with my invention, Fig. 2 is a vertical longitudinal sectional view through the intake manifold structure as illustrated in Fig. 1, Fig. 3 is a transverse vertical sectional view taken substantially on the line 3—3 of Fig. 2 showing the engine throttle valve substantially open and the auxiliary valve for controlling the fuel mixture flow to the engine cylinders about to open, and Fig. 4 is a vertical transverse sectional view similar to Fig. 3 but showing both valves wide open.

I have chosen for purposes of illustration to show my invention as being incorporated with a multi-cylinder engine of the 8-cylinder type, though it will be obvious that the principles of my invention may be employed with engines other than those of the 8-cylinder type. The engine 10 is provided with suitable intake passages 11 communicating with the engine cylinders (not shown), these intake passages being preferably arranged to be connected with a plurality of port runners 12 of an intake manifold structure A. The engine is provided with a suitable fuel mixture forming and supply device or carburetor 13, which is constructed to be connected with a primary fuel mixture conducting means of the intake manifold structure. The port runners 12 communicate directly with a lateral runner 15 extending generally longitudinally of the engine and said primary fuel mixture conducting means is connected with this lateral runner 15 by means of the fuel mixture conducting portions 16, 16' and 17. It will be noted that the conducting portions 16 and 16' communicate with the lateral runner 15 adjacent the ends thereof while the conducting portion 17 communicates with said lateral runner substantially at the mid-point thereof. In the illustrated embodiment of my invention I have preferably provided the specific fuel mixture conducting portions as shown in the drawing though it will be obvious that the principles of my invention may be incorporated in a manifold structure embodying a greater number of intermediate fuel mixture conducting portions.

For controlling the supply of fuel mixture admitted to the primary fuel mixture conducting means 14, I have provided a suitable throttle valve 18 which may be manually controlled in the usual manner. For controlling the fuel mixture flow through the fuel mixture conducting portions, I have provided an auxiliary valve 19 which is so constructed and arranged as to be operated to block or otherwise close one of said fuel mixture conducting portions. This valve 19 is shown in the illustrated embodiment of my invention as being associated with the conducting portions 17 which connects the primary fuel mixture conducting means 14 with the runner 15 at an intermediate point.

I preferably actuate the valve 19 in response to engine operation, and this is accomplished in the device illustrated by providing suitable connections between the valve 19 and the throttle valve 18. The throttle valve 18 is actuated by means of the lever 20 and the valve 19 is suitably connected to a bell crank 21, said bell crank 21 and lever 20 being interconnected by means of a rod 22, this rod 22 being actuated by means of the arm 23 which is preferably manually actuated by any suitable control device. I have preferably provided a lost motion connection between the lever 20 and the crank 21 so as to permit the partial opening of valve 18 prior to any opening movement of the auxiliary valve 19. It will be noted that the rod 22 is provided with a collar or other suitable abutment 24 which engages the bell crank 21 as shown in Fig. 3 after said valve 18 is partly opened. Due to the motion multiplying means incorporated in the devices for actuating the valve 19 as shown in Figs. 3 and 4, the valve 19 is opened quickly during the latter portion of the opening movement of the valve 18.

I preferably surround a portion of the oppositely extending fuel mixture conducting portions 16 and 16' with a suitable heating jacket 25 that is suitably connected with the exhaust manifold by the conduit or other suitable exhaust gas conducting portion 26. It will be thus noted that the intake gases flowing through the conducting portions 16 and 16' will receive more heat than those gases flowing through the conducting portion 17. Thus when the fuel mixture is conducted to the cylinder solely through the conducting portions 16 and 16' the fuel mixture will be warmer than when the fuel mixture is conducted through all of said intermediate fuel mixture conducting portions.

During engine idling operation and during part throttle engine operation it will be noted that the valve 19 blocks or otherwise closes the conducting portion 17 and thus all the fuel mixture which is supplied to the engine cylinders must flow through the intermediate conducting portions 16 and 16'. It is found that by heating the intake gases, the utmost in fuel economy may be obtained for relatively low engine speed operation and for engine idling. For relatively high engine speeds it is found that economical engine operation cannot be obtained when the gases are heated to such an extent as provides economical engine operation for low engine speeds. It is therefore desired to supply the engine with a fuel mixture which is relatively cooler and this is accomplished by opening the fuel mixture conducting portion or passage 17 so as to conduct some of the fuel mixture to the runner 15 in such a way as to avoid subjecting the fuel mixture to the relatively large heated zone. The particular construction herein illustrated provides an intake manifold structure which supplies the engine cylinders with a fuel mixture of the desired temperature for relatively high engine speed operation and therefore by means of the structure herein illustrated, I provide for the utmost fuel economy for relatively high engine speed operation.

It will be noted that the control of the fuel mixture flow through the conducting portions is automatically controlled in response to engine operation, said control being effected by means of a valve or other suitable device associated with one or more of the fuel mixture conducting portions that is preferably connected with the throttle valve by which the engine speed is controlled. By means of my present invention, I have provided for economical and efficient engine operation throughout the range of engine speeds, the present invention being especially adapted for use with engines employed in vehicles which are operated for long periods of time under all conditions.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. An intake manifold structure for an engine having a fuel mixture forming and supply device, said intake manifold structure including a primary fuel mixture conducting portion connected with said device, a lateral fuel mixture conducting portion having a plurality of outlets connected with said engine, a plurality of intermediate conduits connecting said portions, means for applying different amounts of heat to said conduits, and valve means controlling the flow of fuel mixture through one of said intermediate conduits to which a relatively lesser amount of heat is applied whereby to control the resultant temperature of the fuel mixture in said lateral fuel mixture conducting portion by conducting said fuel mixture only through the conduit to which a relatively greater amount of heat is applied or through all of said conduits.

2. An intake manifold structure for an engine having a fuel mixture forming and supply device, said intake manifold structure including a primary fuel mixture conducting portion connected with said device, a throttle valve associated with said primary conducting portion, a lateral fuel mixture conducting portion having a plurality of outlets connected with said engine, a plurality of intermediate conduits connecting said portions, means for applying heat to at least one of said conduits, and valve means operable in response to said throttle valve operation for controlling the flow of fuel mixture through said other intermediate conduit whereby to control the resultant temperature of the fuel mixture in said lateral fuel mixture conducting portion by conducting said fuel mixture only through said heated conduit or through all of said conduits.

3. An intake manifold structure for an engine having a fuel mixture forming and supply device, said intake manifold structure including a primary fuel mixture conducting portion connected with said device, a lateral fuel mixture conducting portion having a plurality of outlets connected with said engine, a plurality of intermediate conduits connecting said portions, said conduits being of substantially equal cross-sectional area, one of said conduits connected to an intermediate portion of said lateral conducting portion, the other of said conduits being connected to an end portion of said lateral conducting portion, means for supplying a relatively greater amount of heat to said latter conduits than to said first conduit, and valve means in said first conduit operable to control the flow of fuel mixture therethrough, whereby to control the resultant temperature of the fuel mixture in said lateral fuel mixture conducting portion.

4. An intake manifold structure for an engine having a fuel mixture forming and supply device, said intake manifold structure including a primary fuel mixture conducting portion connected with said device, a throttle valve associated with said primary conducting portion, a lateral fuel mixture conducting portion having a plurality of outlets connected with said engine, a plurality of intermediate conduits connecting said portions, said conduits being of substantially equal cross sectional area, one of said conduits connected to an intermediate portion of said lateral conducting portion, the other of said conduits being connected to an end portion of said lateral conducting portion, means for supplying a relatively greater amount of heat to said latter conduits than to said first conduit, and valve means in said first conduit operable in response to throttle valve operation to control the flow of fuel mixture therethrough, whereby to control the resultant temperature of the fuel mixture in said lateral fuel mixture conducting portion.

5. An intake manifold structure for an engine having a fuel mixture forming and supply device, said intake manifold structure including a primary fuel mixture conducting portion connected with said device; a lateral fuel mixture conducting portion having outlets connected with said engine; a plurality of intermediate conduits connecting said primary and lateral fuel mixture conducting portions; means arranged to supply heat in different amounts to said conduits, the conduit receiving the greater amount of heat being at all times unrestricted and free to conduct fuel mixture to its maximum capacity from said primary to said lateral portions; and means for controlling the flow of fuel mixture through the conduit receiving the lesser amount of heat, whereby the resultant temperature of the mixture in said lateral portion may be varied in response to the amount of mixture supplied through said lower heated conduit.

HAROLD H. TIMIAN.